A. W. EDWARDS.
Combined Dental Speculum and Shield.

No. 226,989.                  Patented April 27, 1880.

WITNESSES:

INVENTOR:
A. W. Edwards
BY
ATTORNEYS.

UNITED STATES PATENT OFFICE.

ALFRED W. EDWARDS, OF NEW YORK, N. Y.

COMBINED DENTAL SPECULUM AND SHIELD.

SPECIFICATION forming part of Letters Patent No. 226,989, dated April 27, 1880.

Application filed February 11, 1880.

*To all whom it may concern:*

Be it known that I, ALFRED WELLS EDWARDS, of the city, county, and State of New York, have invented a new and useful Improvement in Combined Dental Speculum, Gag, and Shield, of which the following is a specification.

Figure 1:
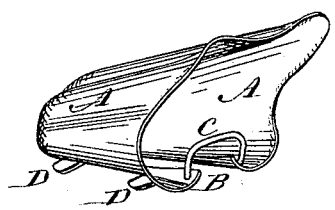
Figure 2:
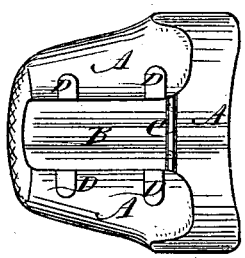
Figure 3:
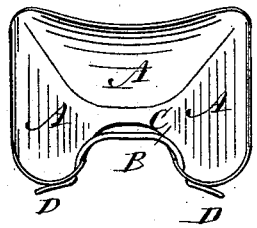

Figure 1 is a perspective view of the improvement. Fig. 2 is a bottom view. Fig. 3 is a front view.

Similar letters of reference indicate corresponding parts.

The object of this invention is to facilitate the performance of dental operations, such as the filling of teeth.

The invention consists in a combined dental speculum, gag, and shield formed of a flaring or bonnet-shaped shell of metal having a longitudinal slot in its lower side to receive the teeth, and an arched wire attached to its lower part, upon the opposite sides of the forward end of the slot, to rest upon the teeth and support the forward part of the shell, as will be hereinafter fully described.

A represents the body or shell of the implement, which is made with a narrow closed inner end and a flaring open outer end. The lower side of the body A is slotted longitudinally to receive the teeth, the lower edge of its inner end resting upon the gum in the rear of the teeth. The forward end of the shell A is supported by an arched wire, C, the ends of which are attached to the shell A upon the opposite side of the forward end of the slot B, and which is designed to rest upon the forward teeth.

The slot B in the shell A is made of such a width as to receive the teeth within it. The upper side of the shell A is slightly concaved for the teeth of the other jaw to rest upon it, so that the shell may serve as a gag to hold the jaws apart, and thus relieve the muscles from the strain of holding the mouth open.

The inner surface of the shell A is polished or made bright to serve as a speculum or reflector for throwing the light upon the teeth. The shell A also keeps the tongue away from the teeth being operated upon. It also distends the cheek and protects the lips. The shell A also serves to hold the napkin and rubber dam and keep them in place while in use.

To better adapt the shell A for holding a napkin small lugs or lips D may be attached to its lower side.

If desired, small eyes may be attached to the inner surface of the lower side of the shell A, upon the opposite sides of the slot B, to receive pins for securing the napkin, so that the shell and napkin may be inserted together.

The shell A may be applied to the teeth of either jaw and upon either side of the mouth with equal facility.

Having thus described my invention, I claim as new and desire to secure by Letters Patent—

The device for use in dental operations, consisting of the flaring bonnet-shaped shell A, having a longitudinal slot, B, in its lower side, and an arched wire, C, attached to its lower part upon the opposite sides of the forward end of its slot, as shown and described.

ALFRED WELLS EDWARDS.

Witnesses:
JAMES T. GRAHAM,
C. SEDGWICK.